Figure 1:
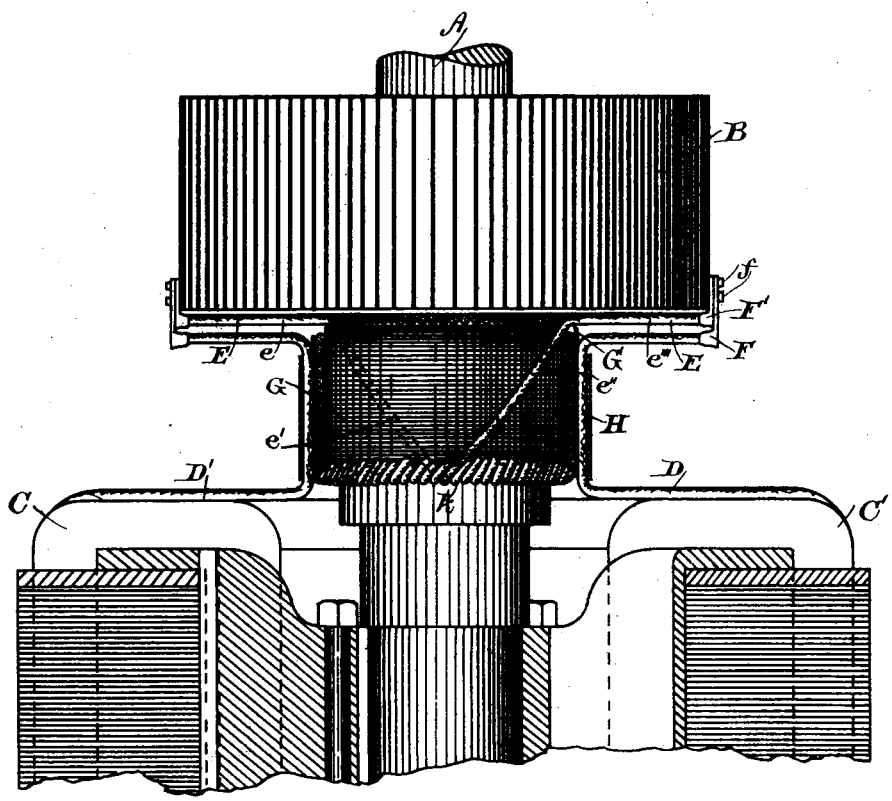

(No Model.) 2 Sheets—Sheet 1.

N. C. BASSETT.
COMMUTATOR CONNECTION.

No. 501,049. Patented July 11, 1893.

WITNESSES
Alec F. Macdonald.
T. J. Johnston.

INVENTOR
Norman C. Bassett
by Bentley and Blodgett
Attorneys.

(No Model.) 2 Sheets—Sheet 2.
N. C. BASSETT.
COMMUTATOR CONNECTION.
No. 501,049. Patented July 11, 1893.
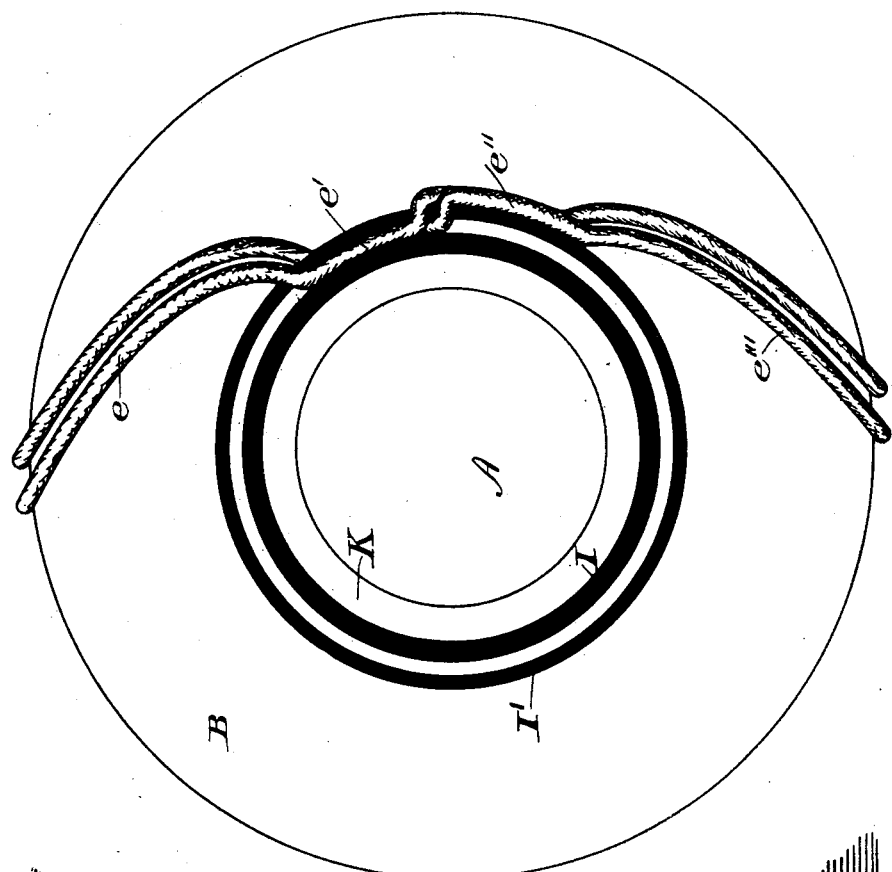
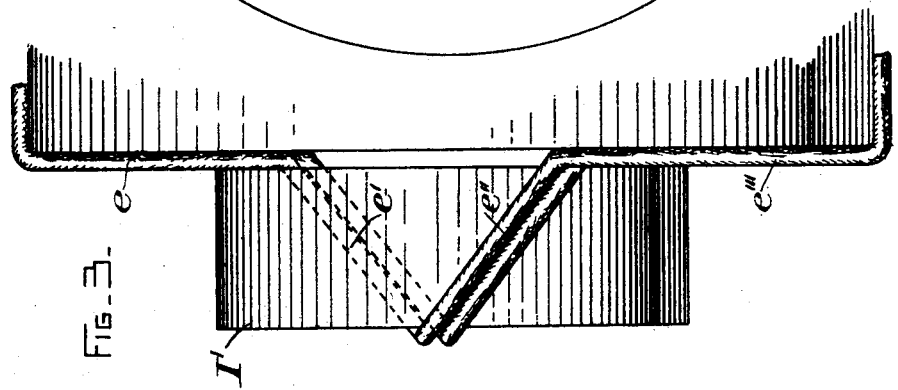
WITNESSES.
Alec F. Macdonald.
T. J. Johnston
INVENTOR.
Norman C. Bassett by
Bentley and Blodgett.
Attys

UNITED STATES PATENT OFFICE.

NORMAN C. BASSETT, OF LYNN, MASSACHUSETTS, ASSIGNOR TO THE GENERAL ELECTRIC COMPANY, OF NEW YORK.

COMMUTATOR CONNECTION.

SPECIFICATION forming part of Letters Patent No. 501,049, dated July 11, 1893.

Application filed February 9, 1893. Serial No. 461,568. (No model.)

*To all whom it may concern:*

Be it known that I, NORMAN C. BASSETT, a citizen of the United States, residing at Lynn, county of Essex, State of Massachusetts, have invented certain new and useful Improvements in Commutator Connections, of which the following is a specification.

My invention relates to commutator connections, and more particularly to those arranged for multi-polar dynamos or motors; and has for its objects to simplify such connections so that they may be readily made, to obtain a symmetrical arrangement of the leads whereby there is less liability to couple them up erroneously, to save space, and to assemble the connections on an arbor which may be interposed between the commutator and the armature. To this end I lead a conection from one section of the commutator to the section which it is desired to connect thereto: first, by making a portion lead directly toward the axis of the shaft of the commutator, then by making it proceed at an angle of forty-five degrees partly around the shaft, then by making a bend of ninety degrees proceeding back around the shaft at an angle of forty-five degrees, then proceeding in the line of the radius again to the section to be coupled in. In the arrangement which I have illustrated in the drawings, the connections are made as suited to a four-pole motor or dynamo; but it is manifest that it may be adapted to one having a greater or less number of poles with a suitable modification, as in a six pole dynamo where the angle of ninety degrees would be changed to one of sixty degrees, or of one of one hundred and twenty degrees, according to the method of connection which it may be desirable to employ.

In the drawings hereunto annexed and hereby made part of this specification like letters refer to like parts.

Figure 1 is a sectional elevation of an armature and commutator showing my invention and Figs. 2 and 3 are side and end elevations of a modification, showing one connection only.

A is the shaft upon which the armature and its commutator are mounted, B is a commutator and C C' are the coils of the armature. All of these parts are of forms commonly known and used in the art.

D D' are cables or connections ordinarily used to connect the coils of the armature with the commutator, while E shows one of the cross-connections referred to herein. As will be observed, a portion of this cross-connection designated by $e$ leads along the back of the commutator toward the arbor in the radius of the commutator; a second portion $e'$ is carried around this arbor at an angle of forty-five degrees to its rear or armature end. The third portion $e''$ is carried at a right angle to the portion $e'$ back to the commutator end of the arbor, whence it is carried, as at $e'''$, in the radius of the commutator to the clamp F', which, together with clamp F is secured to the section of the commutator by the bolts $ff$ in the usual manner.

In practice the connections are made up on a wooden former of the same size as the arbor which they are designed to fit, and the underlying portions thereof are first laid upon the former as far as the points $k\,k$; they are then wrapped in position by the cord G and the second portions $e''\,e'''$ are then laid over the wrapping cord G in the manner set out, and are secured in place by a second wrapping G'. The whole is then removed from the wooden former and slipped over the arbor where it is held in place by the wrapping H which secures the coil leads D D'.

Of course it is understood that suitable insulation is provided for the different places where the wires approximate each other.

The modification shown in Figs. 2 and 3 is the same in principle as the method of laying shown in Fig. 1, and differs therefrom only in making the portion $e$ of the connection proceed on a curve or at an angle to the radius upon the back of the commutator, instead of upon its radius, and in making the arbor K shorter, as where a very compact machine is desired; this arrangement also effects a slight saving of wire. I I' are layers of any suitable insulation.

The connections as shown are designed to be assembled upon the arbor ready to be connected in place of those already upon a dynamo or motor, should the latter be damaged in any way. The bolts $ff$ being removed, the commutator may be slipped off the shaft, the arbor and connections inserted in lieu of the damaged ones, and the commutator replaced; the connections and coil leads are then secured as before.

Having thus described my invention, what I claim, and wish to protect by Letters Patent of the United States, is—

1. In commutators for dynamo-electric machines or motors, cross connections for the sections consisting of a cable E having portions $e$ laid at an angle to the radius upon the back of the commutator, and portions $e'$ and $e''$ crossing and overlying and underlying each other, respectively, at an angle upon an arbor mounted on the shaft between the armature and the commutator, substantially as described.

2. As a new article of manufacture, the cross-connections of a commutator for dynamo-electric machines and motors, assembled upon an arbor adapted to be mounted upon the shaft between the armature and the commutator; the connections proceeding at an angle around the arbor, and having parts overlying and underlying each other, respectively, as herein set out and described.

In testimony whereof I have hereunto set my hand this 4th day of February, 1893.

NORMAN C. BASSETT.

Witnesses:
JOHN W. GIBBONEY,
ELIHU THOMSON.